US007505839B2

(12) United States Patent
Anzai et al.

(10) Patent No.: US 7,505,839 B2
(45) Date of Patent: Mar. 17, 2009

(54) VEHICULAR DATA RECORDING DEVICE

(75) Inventors: Hiroyasu Anzai, Niiza (JP); Soubei Tanaka, Niiza (JP)

(73) Assignee: Honda Access Corporation, Niiza-shi (JP)

( * ) Notice: Subject to any disclaimer, the term of this patent is extended or adjusted under 35 U.S.C. 154(b) by 289 days.

(21) Appl. No.: 11/515,204

(22) Filed: Sep. 5, 2006

(65) Prior Publication Data

US 2007/0055422 A1 Mar. 8, 2007

(30) Foreign Application Priority Data

Sep. 6, 2005 (JP) ............................ 2005-258416

(51) Int. Cl.
*G01M 17/00* (2006.01)

(52) U.S. Cl. ........................................ 701/35; 340/540

(58) Field of Classification Search .................. 701/35; 340/426, 540, 426.22, 426.24
See application file for complete search history.

(56) References Cited

U.S. PATENT DOCUMENTS

| | | | | |
|---|---|---|---|---|
| 6,298,290 | B1 * | 10/2001 | Abe et al. | 701/35 |
| 6,324,450 | B1 * | 11/2001 | Iwama | 701/35 |
| 6,389,340 | B1 * | 5/2002 | Rayner | 701/35 |
| 6,472,982 | B2 * | 10/2002 | Eida et al. | 340/539.1 |
| 2004/0113763 | A1 * | 6/2004 | Bendavid et al. | 340/436 |
| 2004/0263647 | A1 * | 12/2004 | Yamaguchi | 348/240.2 |
| 2005/0185052 | A1 * | 8/2005 | Raisinghani et al. | 348/148 |

FOREIGN PATENT DOCUMENTS

JP 1-178697 U 12/1989

* cited by examiner

*Primary Examiner*—Mark Hellner
(74) *Attorney, Agent, or Firm*—Westerman, Hattori, Daniels & Adrian, LLP.

(57) ABSTRACT

A vehicular data recording device enabling a driver to get to know more about his driving technique to improve it. Not only images from a monitoring camera when a shock is detected are simply recorded in a memory card, but also images from the monitoring camera when no shock is detected are always updated and recorded in an HDD successively. Accordingly, images from the monitoring camera in various situations not leading to an accident can be surely supplied to a driver. This prompts the driver to reflect the driving thereof based on the images from the monitoring camera in the various situations. This can allow the driver to figure out the driving skill thereof, and improve the driving skill.

7 Claims, 13 Drawing Sheets

FIG.5

T100

| Shock Detection Unit | Accident Determination Condition | |
|---|---|---|
| Backward and Forward Acceleration Detection Circuit | Backward and Forward Acceleration is Greater than or Equal to 0.5[G] and More Than or Equal to 1.0[sec] | TB1 |
| | Backward and Forward Acceleration is Greater than or Equal to 2.0[G] | TB2 |
| Rightward and Leftward Acceleration Detection Circuit | Rightward and Leftward Acceleration is Greater than or Equal to 0.5[G] and Less Than or Equal to 0.5[sec] | TB3 |

Backward and Forward Acceleration when Normal Braking is Applied

Backward and Forward Acceleration when Braking is Slightly Applied

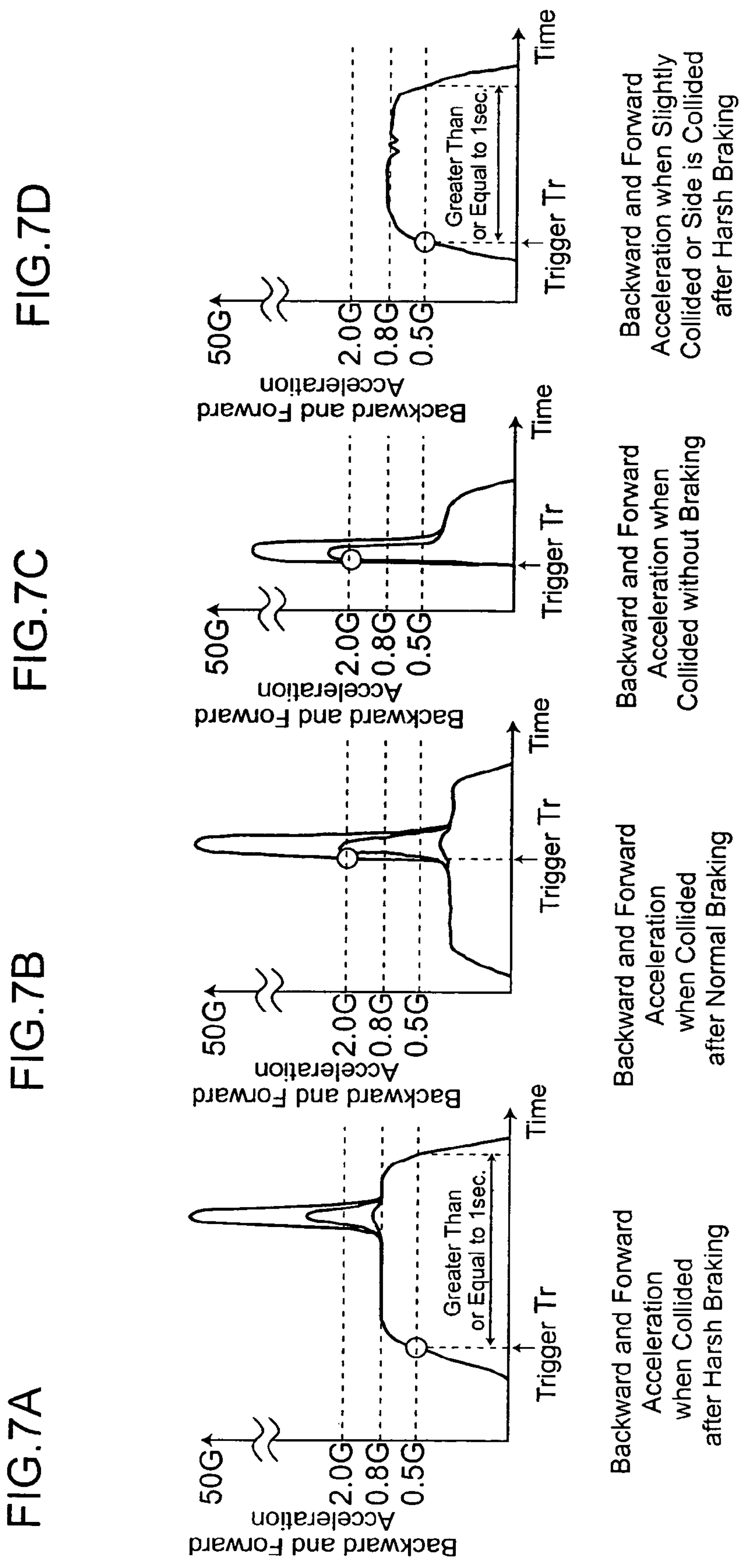
FIG.7A
Backward and Forward Acceleration
50G
2.0G
0.8G
0.5G
Greater Than or Equal to 1sec.
Trigger Tr
Time
Backward and Forward Acceleration when Collided after Harsh Braking
FIG.7B
Backward and Forward Acceleration
50G
2.0G
0.8G
0.5G
Trigger Tr
Time
Backward and Forward Acceleration when Collided after Normal Braking
FIG.7C
Backward and Forward Acceleration
50G
2.0G
0.8G
0.5G
Trigger Tr
Time
Backward and Forward Acceleration when Collided without Braking
FIG.7D
Backward and Forward Acceleration
50G
2.0G
0.8G
0.5G
Greater Than or Equal to 1sec.
Trigger Tr
Time
Backward and Forward Acceleration when Slightly Collided or Side is Collided after Harsh Braking Rightward and Leftward Acceleration
when Cornering is Performed at Fast Speed Rightward and Leftward
Acceleration
when Side is Collided

VEHICULAR DATA RECORDING DEVICE

BACKGROUND OF THE INVENTION

1. Field of the Invention

The present invention relates to a vehicular data recording device, and is suitably applied to, for example, a vehicular data recording device which records images picked up by an in-vehicle monitoring camera.

2. Description of the Related Art

For example, Unexamined Japanese Utility Model Publication No. H1-178697 discloses a conventional vehicle running state recording device which constantly images a situation in driving by an in-vehicle monitoring camera, records an image picked up by the monitoring camera in a recording medium only when an accident occurs, enabling a user to figure out the accident situation after the accident.

Actually, when detecting a shock greater than or equal to a predetermined setting, the vehicle running state recording device records only images for a predetermined time of period before and after detection of the shock.

However, in the vehicle running state recording device with such a structure, even if a small shock due to a minor collision or the like is detected, images from the monitoring camera when the shock has occurred are not recorded in the recording medium in consideration of the recording capacity of the recording medium. Accordingly, a driver cannot see various situations leading to no accidents again.

However, to improve the driving skill of the driver, it is preferable to provide the driver with not only images before and after occurrence of an accident but also images on various situations in driving, prompting the driver to reflect the driver's driving based on those images.

The present invention has been made in view of such circumstances, and it is an object of the invention to provide a vehicular data recording device which allows a driver to figure out the driving skill thereof, and attempt to improve that driving skill.

SUMMARY OF THE INVENTION

To achieve the object, a vehicular data recording device of the invention comprises:

a recording unit which records outputs from an in-vehicle sensor, mounted in a vehicle, before and after a shock is applied to the vehicle; and a shock detection unit which detects a shock to the vehicle, wherein the recording unit includes:

- a first recording medium;
- a second recording medium which can record longer than the first recording medium; and
- a recording controller which saves outputs from the in-vehicle sensor in the first recording medium continuously based on a detection result of the shock detection unit, and successively updates and records outputs from the in-vehicle sensor within a recording capacity of the second recording medium.

According to the vehicular data recording device of the invention, not only outputs from the in-vehicle sensor when a shock is detected are just recorded in the first recording medium, but also outputs from the in-vehicle sensor when no shock is detected are always successively updated and recorded in the second recording medium. Outputs from the in-vehicle sensor in various situations leading to no accident can be surely supplied to a driver. This results in prompting the user to reflect the driver's driving based on the outputs from the in-vehicle sensor in the various situations, and the driver can figure out the driving skill thereof, and attempts to improve that driving skill.

The recording controller may transfer the outputs from the in-vehicle sensor continuously saved in the first recording medium to the second recording medium before a recording capacity of the first recording medium reaches a limit.

When detecting a backward and forward acceleration or a rightward and leftward acceleration which satisfies a predetermined condition from the shock detection means, the recording controller may save an output at a predetermined time in the outputs stored in the first recording medium as at-time-of-occurrence-of-shock information in the first recording medium.

The in-vehicle sensor may be a monitoring camera.

The first recording medium may be a portable external memory which comprises an electrically rewritable nonvolatile memory, and is freely removable from a device main unit, and the second recording medium may be a hard disk drive installed in the device main unit.

The vehicular data recording medium may be structured in such a way that the at-time-of-occurrence-of-shock information recorded in the first recording medium is transferable to the second recording medium, and the at-time-of-occurrence-of-shock information recorded in the second recording medium is transferable to the first recording medium.

When an ACC is turned off or a shift lever is in a parking range even though an ACC is turned on, the at-time-of-occurrence-of-shock information recorded in the first recording medium may be automatically transferred to the second recording medium.

BRIEF DESCRIPTION OF THE DRAWINGS

FIG. 5 is a schematic diagram illustrating the structure of an accident determination table;

FIGS. 7A to 7D are schematic diagrams illustrating the appearances of backward and forward accelerations when a collision occurs after harsh braking, when a collision occurs after normal braking, when a collision occurs without braking, and when a minor collision occurs after harsh braking, respectively;

DETAILED DESCRIPTION OF THE PREFERRED EMBODIMENT

Figure 1:
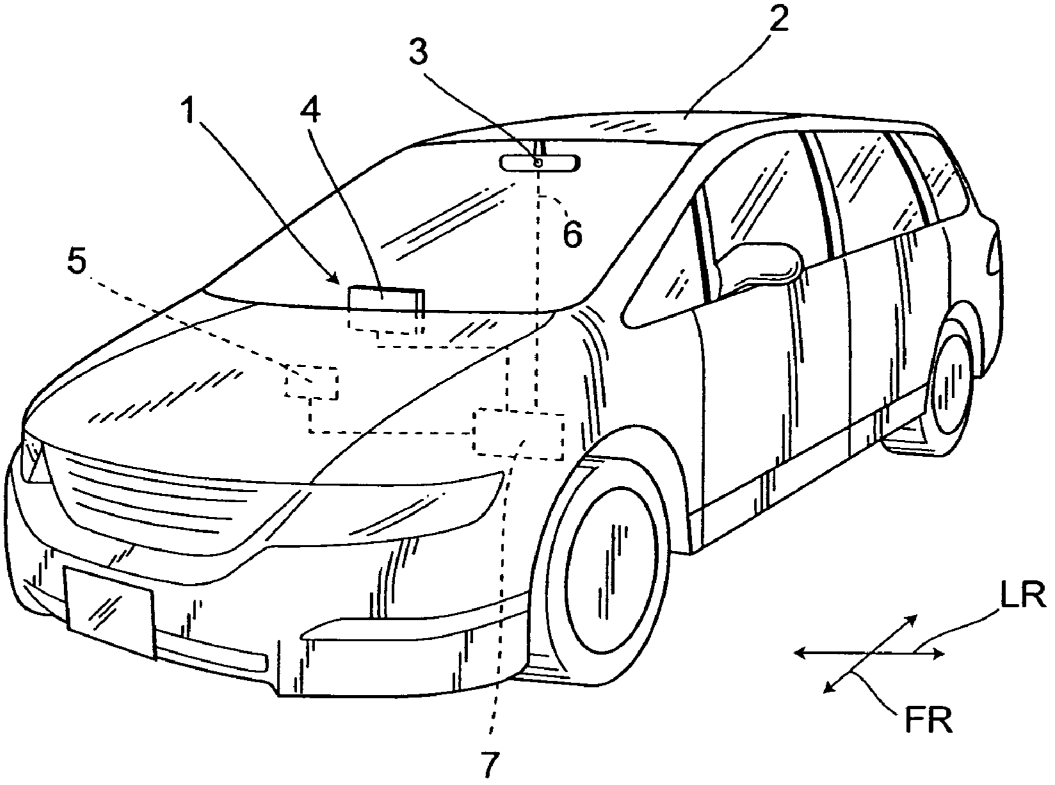
FIG. 1 is a perspective view illustrating a vehicle in which a vehicular data recording device of the invention is mounted.

An embodiment of the present invention will be elaborated with reference to the accompanying drawings.

(1) General Structure of Vehicular Data Recording Device

Reference number 1 generally denotes a vehicular data recording device of the invention. The vehicular data recording device 1 is structured in such a way that a monitoring camera 3 mounted in a vehicle 2, a monitor 4 disposed at, for example, the approximate center of a dash board in the vicinity of front seats, and an operation unit 5 are connected to a device main unit 7 by cables 6.

The monitoring camera 3 serving as an in-vehicle sensor functions as vehicle surrounding information acquisition means which acquires information on the surrounding of the vehicle. In this case, the monitoring camera 3 images a frontward view of the vehicle, and always acquires the image of that view as vehicle surrounding information. Images picked up by the monitoring camera 3 are continuously recorded in the device main unit 7.

In the embodiment, because the monitoring camera 3 is disposed in the interior of the vehicle 2, the monitoring camera 3 is not damaged by rain water or the like, and can surely keep imaging views in a predetermined direction regardless of a weather condition.

As the monitoring camera 3 is disposed on the rear face of a room mirror at the approximate center in the vicinity of the front seats, an obstacle or the like does not directly hit the monitoring camera 3 when a collision or the like occurs. Accordingly, the monitoring camera 3 is not likely to be damaged by a shock of an accident comparatively, and thus can surely shoot images before and after occurrence of an accident.

Further, as the monitoring camera 3 can image a frontward view of the vehicle 2 at the same height as the visual line of a driver, it is possible to provide an image as if the image were provided by a person sitting in a front seat. Note that the monitoring camera 3 may image the rearward view and rightward and leftward views of the vehicle 2, and more than one monitoring camera may be provided.

As a predetermined operation instruction is input through the operation unit 5, the device main unit 7 displays a recorded past image or the like picked up by the monitoring camera 3 on the monitor 4.

In addition to such a structure, the device main unit 7 is structured in such a manner as to be capable of detecting an acceleration applied in the lengthwise direction FR of the vehicle 2 (hereinafter, this acceleration is called "backward and forward acceleration"), and an acceleration applied in the widthwise direction LR (hereinafter, this acceleration is called "rightward and leftward acceleration"). As a shock is applied because of an accident and a backward and forward acceleration or a rightward and leftward acceleration which satisfies a predetermined condition is detected, an image from the monitoring camera 3 is recorded, thus saving an image before and after occurrence of the accident (before and after a shock).

(2) Circuit Structure of Vehicular Data Recording Device

Figure 2:
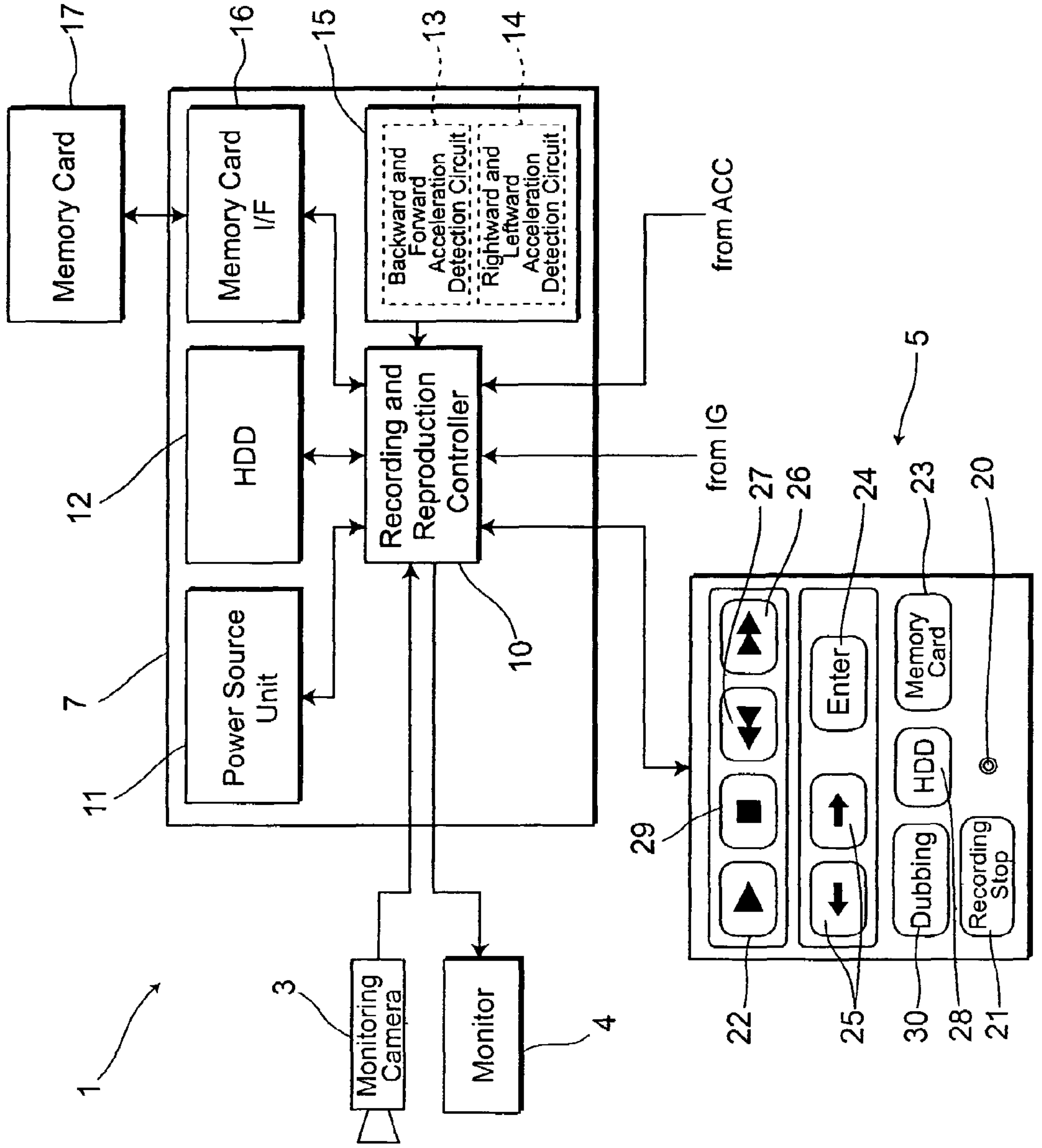
FIG. 2 is a block diagram illustrating the circuit structure of the vehicular data recording device of the invention.

As illustrated in FIG. 2, in the vehicular data recording device 1, a recording and reproduction controller 10 is connected with a power source unit 11, an HDD (Hard Disk Drive) 12, a shock detection unit 15 which comprises a backward and forward acceleration detection circuit 13 and a rightward and leftward acceleration detection circuit 14 and serves as shock detection means, a memory card interface 16, the operation unit 5, the monitoring camera 3 and the monitor 4. A randomly accessible memory card 17 is loaded in the memory card interface 16.

In this case, the recording and reproduction controller 10 serving as record controlling means comprises a CPU (Central Processing Unit, not shown), a RAM (Random Access Memory), a ROM (Read Only Memory), a recording counter, and the like. The ROM stores various programs, such as a basic program and a recording and reproduction program beforehand.

The recording and reproduction controller 10 appropriately reads out various programs, such as the basic program and the recording and reproduction program from the ROM in accordance with an operation instruction input from the operation unit 5, and develops those programs in the RAM to perform the general systematic control of the vehicular data recording device 1 in accordance with the various programs, thereby realizing various functions.

For example, in accordance with the recording and reproduction program, the recording and reproduction controller 10 controls the monitoring camera 3 to execute an imaging process in response to an operation instruction input from the operation unit 5.

The recording and reproduction controller 10 receives plural pieces of image data output from the monitoring camera 3, temporarily stores the plural pieces of image data in the memory card 17, and successively records them in the HDD 12.

The recording and reproduction controller 10 reads out the plural pieces of image data successively recorded in the HDD 12 in accordance with the necessity, and outputs them to the monitor 4, thereby displaying images based on the plural pieces of image data on the monitor 4.

In accordance with a detection result received from the shock detection unit 15, the recording and reproduction controller 10 records a piece of image data at a predetermined time in the plural pieces of image data retrieved in the memory card 17 as at-time-of-occurrence-of-shock information (i.e., information at the time of shock occurrence, to be discussed later), thus continuously saving the at-time-of-occurrence-of-shock information in the memory card 17.

The memory card 17 serves as a first recording medium comprising a semiconductor memory. The memory card 17 employs a structure such that a flash memory element which is a kind of electrically rewritable nonvolatile memory (like an EEPROM (Electrically Erasable Programmable Read Only Memory)) is housed in a thin plastic case, so that the memory card 17 can withstand a relatively large shock. The memory card 17 is a portable external memory which enables and writing and reading of various data, such as image data and sound data.

The recording and reproduction controller 10 is connected to an ACC (accessory) and an IG (ignition) and each circuit of the device main unit 7, the monitor 4 and the monitoring camera 3 are operated by power supplied from an in-vehicle power source (not shown) through the ACC.

In addition to the structure, the power source unit 11 provided in the device main unit 7 and serving as auxiliary power source means has a secondary battery therein. The power source unit 11 is charged by electrical power supplied from the in-vehicle power source, and starts supplying power to the device main unit 7 to operate the device main unit 7 even if power supply from the in-vehicle power source is stopped.

(3) Image Recording Process

Figure 3:
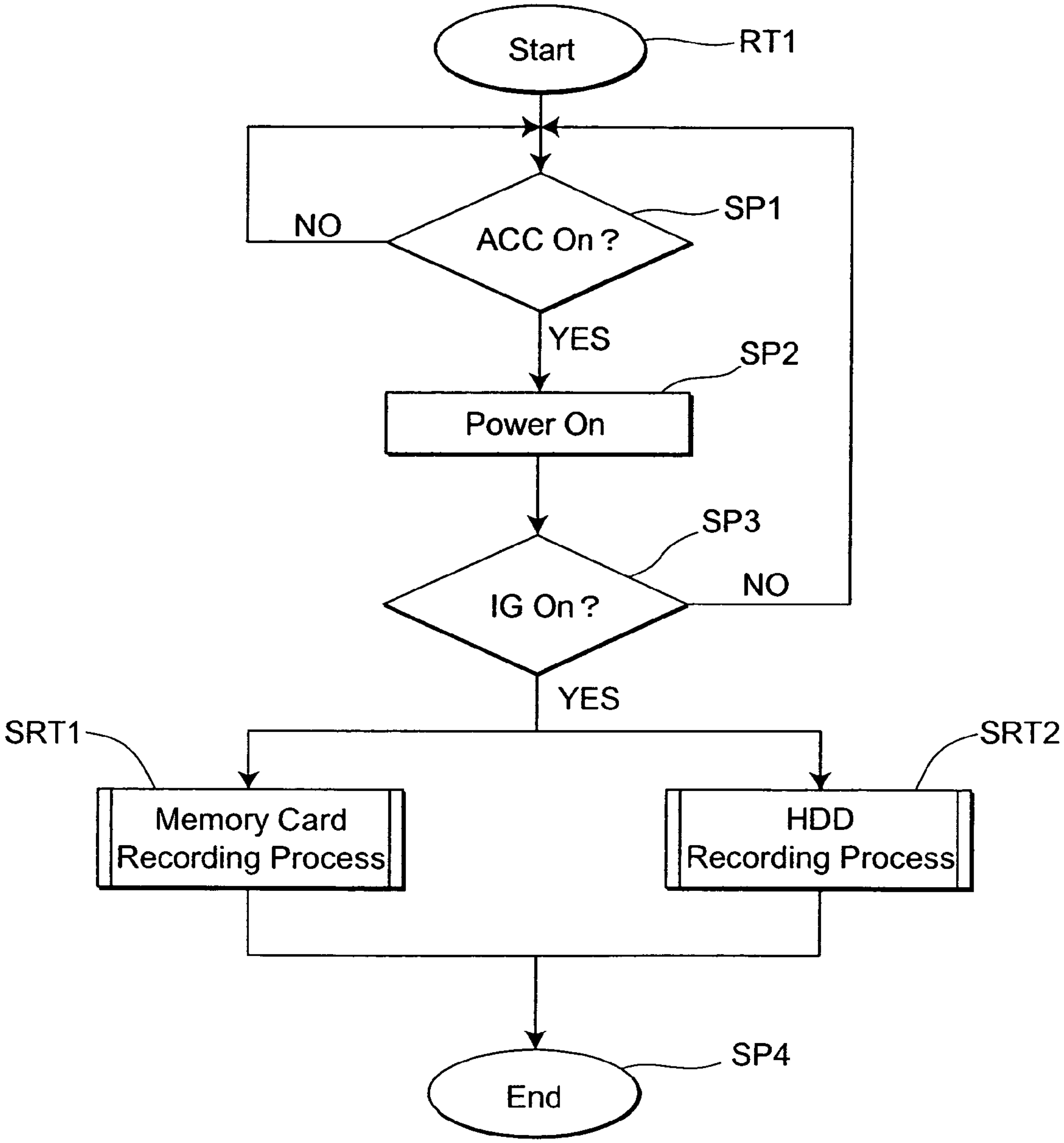
FIG. 3 is a flowchart illustrating the procedures of an image recording process.

Next, an image recording process of the vehicular data recording device 1 will be explained with reference to the flowchart in FIG. 3.

The recording and reproduction controller 10 starts the start step of routine RT1, and moves to step SP1. The recording and reproduction controller 10 determines whether the ACC is turned on or not in the step SP1. If a negative determination result is obtained, which means that the ACC is not turned on, i.e., an ignition key is not at the position of the ACC, the recording and reproduction controller 10 stands by until the ACC is turned on.

On the other hand, if a positive determination result is obtained in the step SP1, which means that the ignition key is at the position of the ACC and the ACC is turned on, the recording and reproduction controller 10 moves to next step SP2.

In the step SP2, the recording and reproduction controller 10 sets the various circuits operable based on the power supplied from the in-vehicle power source when powered on, and moves to next step SP3.

The recording and reproduction controller 10 determines whether the IG is turned on or not in the step SP3. If a negative determination result is obtained, this means that the IG is not turned on, i.e., the ignition key is still at the potion of the ACC, and is not at the position of the IG. In this case, the recording and reproduction controller 10 repeats the foregoing process until the IG is turned on.

On the other hand, if a positive determination result is obtained at the step SP3, this means that the IG is turned on, i.e., the ignition key is at the position of the IG. In this case, the recording and reproduction controller 10 moves to next sub routines SRT1 and SRT2, after which the process progresses to step SP4 to terminate the image recording process.

(3-1) Memory Card Recording Process

Figure 4:
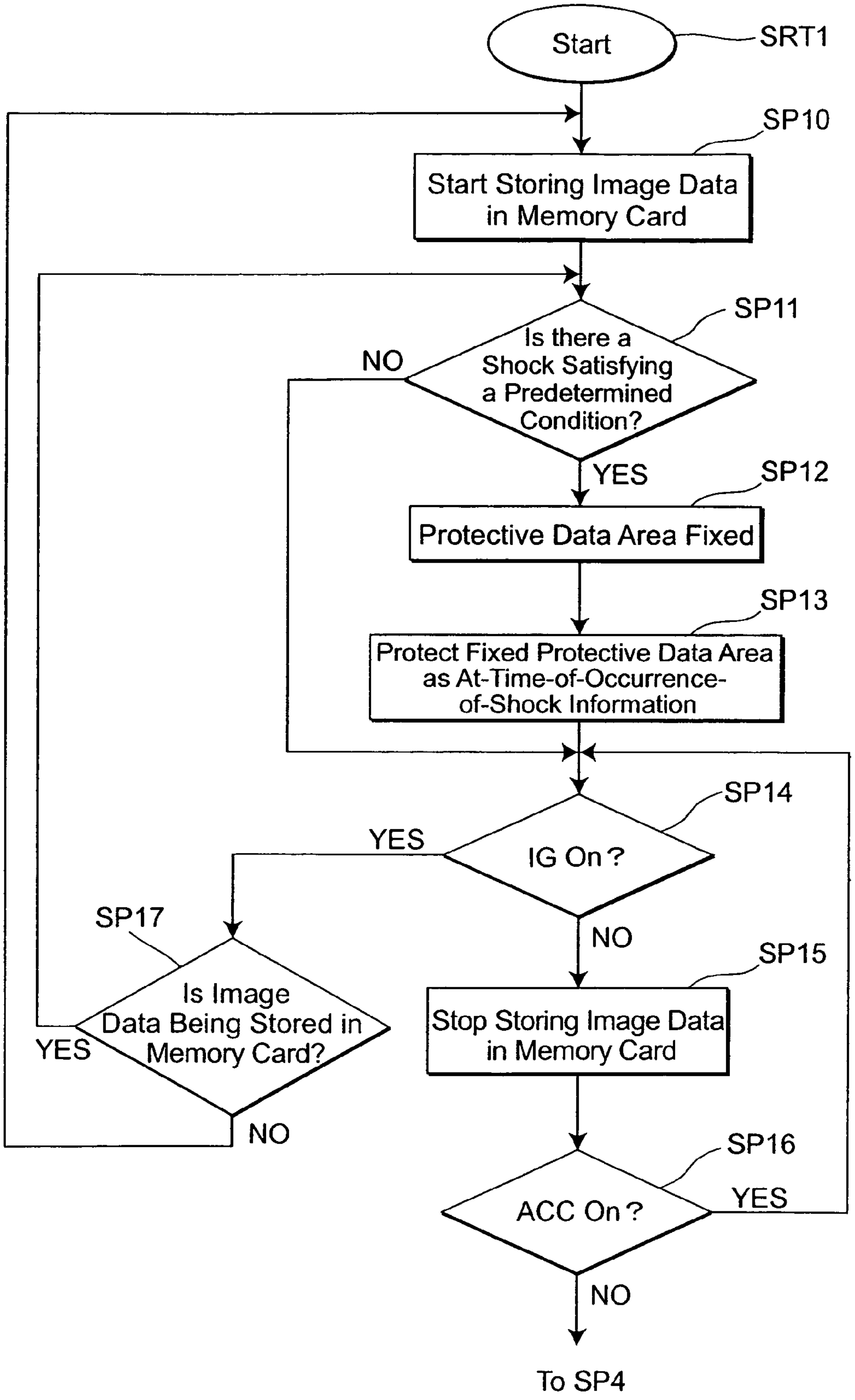
FIG. 4 is a flowchart illustrating the procedures of a memory card recording process.

As illustrated in FIG. 4, the recording and reproduction controller 10 starts a memory card recording process from the start step of the sub routine SRT1, and moves to next step SP10.

In the step SP10, the recording and reproduction controller 10 receives backward and forward acceleration data and rightward and leftward acceleration data from the shock detection unit 15, sends image data obtained by imaging started by the monitoring camera 3 to the memory card 17 through a memory card interface, stores the image data as it is in the memory card 17, and moves to next step SP11.

In this case, the recording and reproduction controller 10 stores plural pieces of image data sequentially obtained from the monitoring camera 3 in the overwritable recording area in the memory card 17 comprising a semiconductor memory in real time. When there is no free space in the recording area, the recording and reproduction controller 10 overwrites the old image data with latest image data in order, so that the latest image data is always stored within the recording capacity of the memory card 17 successively.

As at-time-of-occurrence-of-shock information to be discussed later is recorded in the memory card 17 in an undeletable state as long as the driver or the like deletes the at-time-of-occurrence-of-shock information through the operation unit 5, the at-time-of-occurrence-of-shock information is not overwritten with the latest image data, and continuously saved in this case.

In the step SP11, the recording and reproduction controller 10 determines whether or not a backward and forward acceleration or a rightward and leftward acceleration satisfying a predetermined condition with respect to the vehicle 2 is detected based on backward and frontward acceleration data or rightward and leftward acceleration data obtained from the shock detection unit 15, i.e., whether or not an accident has occurred.

Actually, the backward and frontward acceleration detection circuit 13 detects a backward and frontward acceleration, and sends this acceleration as backward and frontward acceleration data to the recording and reproduction controller 10. The rightward and leftward acceleration detection circuit 14 detects a rightward and leftward acceleration, and sends this acceleration as rightward and leftward acceleration data to the recording and reproduction controller 10.

As illustrated in FIG. 5, the recording and reproduction controller 10 stores an accident determination table T100 defining predetermined accident determination conditions in the local ROM beforehand, determines the magnitude of a shock applied to the vehicle 2 based on the backward and frontward acceleration data obtained from the backward and frontward acceleration detection circuit 13, the rightward and leftward acceleration data obtained from the rightward and leftward acceleration detection circuit 14, and the accident determination table T100. Based on this determination, the recording and reproduction controller 10 can determine whether or not an accident has occurred.

Actually, associated with the backward and frontward acceleration detection circuit 13 in the accident determination table T100 are a first backward and frontward accident determination condition TB1 where a backward and frontward acceleration is greater than or equal to 0.5 G, and the backward and frontward acceleration greater than or equal to 0.5 G continues for 1 sec or longer, and a second backward and frontward accident determination condition TB2 where a backward and frontward acceleration is greater than equal to 2.0 G.

That is, as the recording and reproduction controller 10 receives backward and frontward acceleration data from the backward and frontward acceleration detection circuit 13, the recording and reproduction controller 10 determines whether or not a backward and frontward acceleration based on the backward and frontward acceleration data satisfies the first backward and frontward accident determination condition TB1 or the second backward and frontward accident determination condition TB2.

Figure 6B:
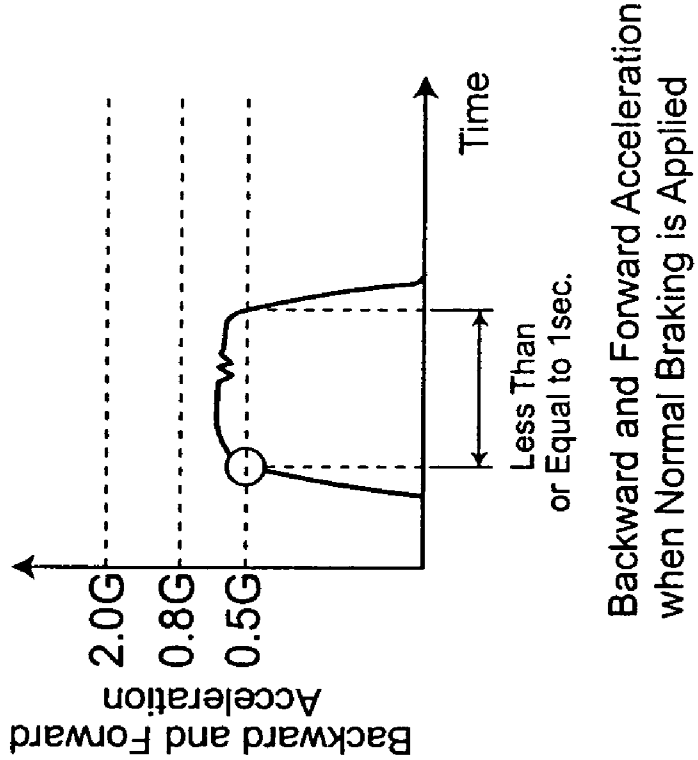
FIGS. 6A and 6B are schematic diagrams illustrating the aspects of backward and forward accelerations when braking is slightly applied and when normal braking is applied.
Figure 6A:
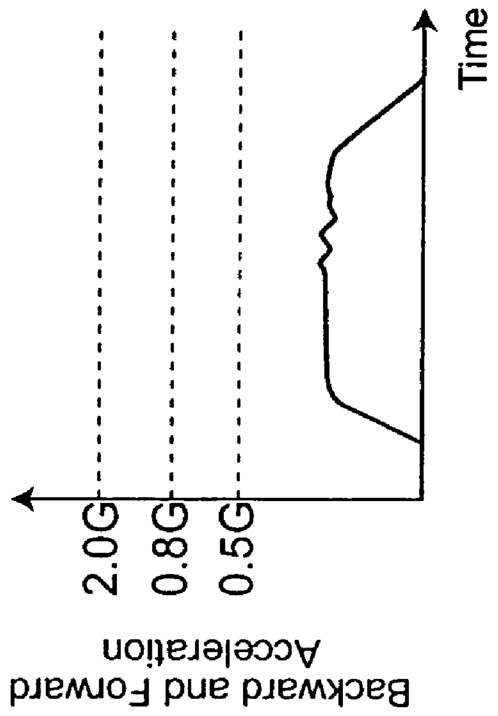

As a determination result, in a case where the driver slightly applies a braking, for example, as illustrated in FIG. 6A, a backward and frontward acceleration generally becomes less than or equal to 0.5 G, and both of the first backward and frontward accident determination condition TB1 and the second backward and frontward accident determination condition TB2 are not satisfied, so that it is determined that no accident has occurred.

In a case where the driver gradually slows down the vehicle 2 and applies a braking to stop the vehicle 2 (i.e., normal braking), as illustrated in FIG. 6B, a backward and frontward acceleration generally becomes greater than equal to 0.5 G, but such a backward and frontward acceleration continues for 1 sec or less, and that both of the first backward and frontward accident determination condition TB1 and the second backward and frontward accident determination condition TB2 are not satisfied, so that it is determined that no accident has occurred.

In contrast, in a case where, for example, the vehicle 2 collides with an obstacle like another vehicle after a harsh braking, as illustrated in FIG. 7A, a backward and frontward acceleration greater than or equal to 0.5 G continues more than or equal to 1 sec., and the backward and frontward acceleration becomes greater than or equal to 2.0 G, so that both of the first backward and frontward accident determination condition TB1 and the second backward and frontward accident determination condition TB2 are satisfied, and it is determined that an accident has occurred. In this case, the recording and reproduction controller 10 sets a time when the backward and frontward acceleration becomes 0.5 G as a trigger Tr, and a trigger generated time can be recognized by the recording counter (not shown).

As illustrated in FIG. 7B, in a case where the vehicle 2 collides with an obstacle after a normal braking, and as illustrated in FIG. 7C, in a case where the driver does not apply a braking, i.e., in a case where the vehicle 2 collides with an obstacle without a braking, a backward and frontward acceleration generally becomes greater than or equal to 2.0 G, so that the second backward and frontward accident determination condition TB2 is satisfied, and it is determined that an accident has occurred. In this case, the recording and reproduction controller 10 sets a time when the backward and frontward acceleration becomes 2.0 G as a trigger Tr, and a trigger generated time can be recognized by the recording counter.

Further, in a case where the vehicle 2 collides with an obstacle like a bicycle after a harsh braking 2, and a side of the vehicle 2 is collided with another vehicle, as illustrated in FIG. 7D, a backward and frontward acceleration greater than or equal to 0.5 G continues more than or equal to 1 sec., so that the first backward and frontward accident determination condition TB1 is satisfied, and it is determined that an accident has occurred. In this case, the recording and reproduction controller 10 sets a time when the backward and frontward acceleration becomes 0.5 G as a trigger Tr, and a trigger generated time can be recognized by the recording counter.

In addition, as illustrated in FIG. 5, associated with the rightward and leftward acceleration detection circuit 14 in the accident determination table T100 is a rightward and leftward accident determination condition TB3 where a rightward and leftward acceleration is greater than or equal to 0.5 G, and the rightward and leftward acceleration greater than or equal to 0.5 G continues less than or equal to 0.5 sec.

Figure 8:
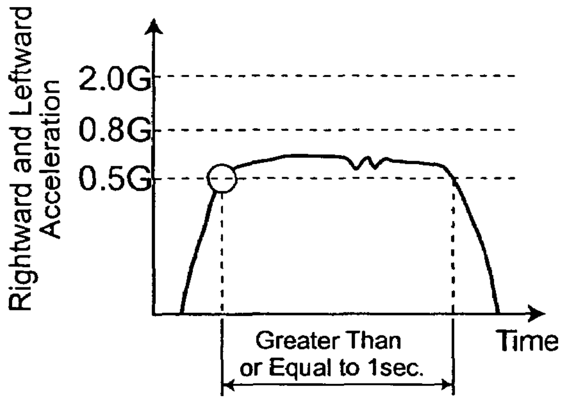
FIG. 8 is a schematic diagram illustrating the aspect of a rightward and leftward acceleration when cornering is performed at a fast speed.

As a result, when the vehicle 2 performs cornering at a fast speed, for example, a rightward and leftward acceleration generally becomes greater than or equal to 0.5 G, and continues more than or equal to 1 sec. (i.e., more than or equal to 0.5 sec.) as illustrated in FIG. 8. This does not satisfy the rightward and leftward accident determination condition TB3, so that it is determined that no accident has occurred.

Figure 9:
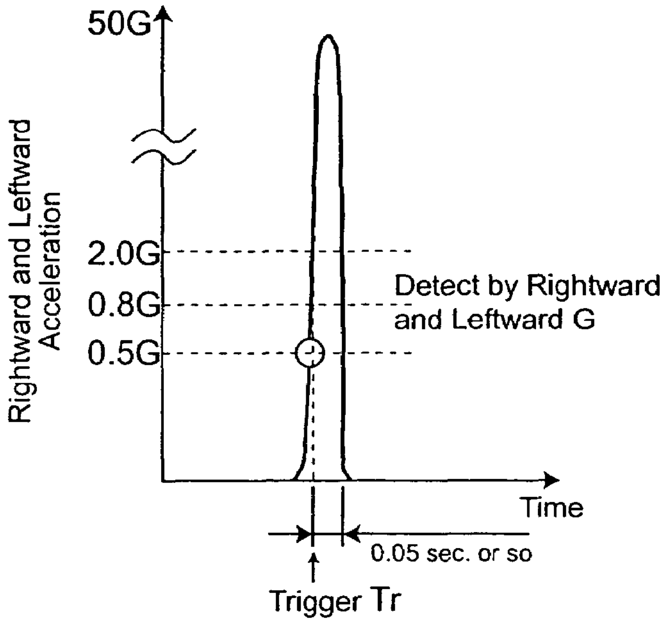
FIG. 9 is a schematic diagram illustrating the aspect of a rightward and leftward acceleration when a lateral collision occurs.

In contrast, in a case where another vehicle collides with the side of the vehicle 2 (i.e., widthwise direction LR side in FIG. 1), as illustrated in FIG. 9, a rightward and leftward acceleration generally becomes greater or equal to 0.5 G within a short period of 0.05 sec. or so. The rightward and leftward accident determination condition TB3 is satisfied, and it is determined that an accident has occurred. In this case, the recording and reproduction controller 10 sets a time when the rightward and leftward acceleration becomes 0.5 G as a trigger Tr, and a trigger generated time can be recognized by the recording counter.

If a positive determination result is obtained in the step SP11, this means that a backward and forward acceleration based on backward and forward acceleration data satisfies the first backward and forward accident determination condition TB1 and the second backward and forward accident determination condition TB2, or a rightward and leftward acceleration based on rightward and leftward acceleration data satisfies the rightward and leftward accident determination condition TB3, and an accident has occurred. In this case, the recording and reproduction controller 10 moves to next step SP12.

In the step SP12, the recording and reproduction controller 10 fixes pieces of image data, which are temporarily stored in the memory card 17 within a period from a time 10 sec. before when the trigger is generated to a time 5 sec. after the trigger is generated, in plural pieces of image data temporarily stored in the memory card 17 as a protected data area, and moves to next step SP13.

In the step SP13, the recording and reproduction controller 10 records the protected data area as at-time-of-occurrence-of-shock information in the memory card 17, and the process progresses to next step SP14.

Figure 10:
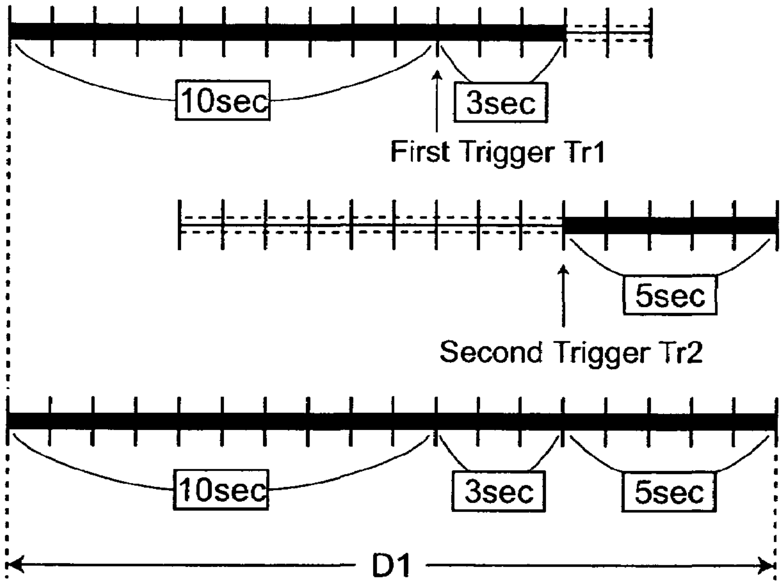
FIG. 10 is a schematic diagram illustrating a first protected data area when a second trigger is generated successively after a first trigger is generated.

As illustrated in FIG. 10, in a case where a second trigger Tr2 is successively generated within 5 sec. after a first trigger Tr1 is generated (for example, 3 sec. after the first trigger Tr1 is generated), the recording and reproduction controller 10 collects plural pieces of image data which are temporarily stored in the memory card 17 within a period from a time 10 sec. before the first trigger Tr1 is generated to a time 5 sec. after the second trigger Tr2 is generated (in this case, 18 sec. total), fixes the plural pieces of image data as one protected data area D1, and records the protected data area D1 as at-time-of-occurrence-of-shock information in the memory card 17.

Figure 11:
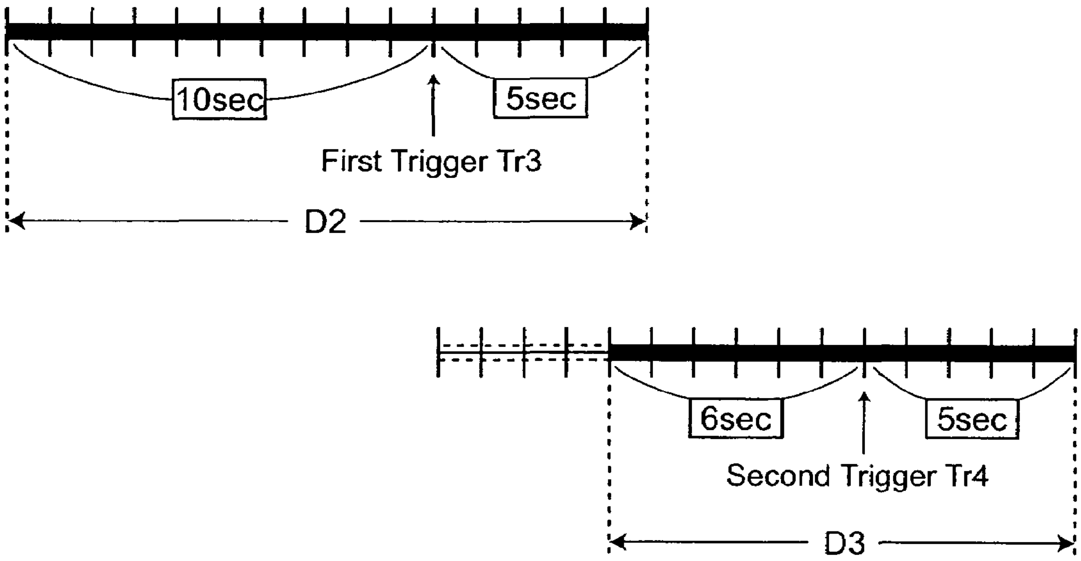
FIG. 11 is a schematic diagram illustrating a second protected data area when a second trigger is generated successively after a first trigger is generated.

As illustrated in FIG. 11, in a case where a period of more than or equal to 5 sec. has elapsed after a first trigger Tr1 is generated and a second trigger Tr4 is generated within 15 sec. (for example, in a case where the second trigger Tr4 is generated 11 sec. after a first trigger Tr3 is generated), the recording and reproduction controller 10 first fixes pieces of image data, which are temporarily stored in the memory card 17 within a period from a time 10 sec. before the first trigger Tr3 is generated to a time 5 sec. after the first trigger Tr3 is generated, as a first protected data area D2, and records the first protected data area D2 as at-time-of-occurrence-of-shock information in the memory card 17.

Next, the recording and reproduction controller 10 fixes pieces of image data, which are temporarily stored in the memory card 17 within a period from a time before the second trigger Tr4 is generated and 5 sec. after the first trigger Tr3 is generated to a time 5 sec. after the second trigger Tr4 is generated (in this case, 11 sec. total), as a protected data area D3, and records the protected data area D3 as at-time-of-occurrence-of-shock information in the memory card 17.

The recording and reproduction controller 10 determines whether the IG is turned on or not in the step SP4. If a negative determination result is obtained, this means that the IG is shifted from an ON state to an OFF state, and the recording and reproduction controller 10 moves to the next step SP15.

In the step SP15, the recording and reproduction controller 10 stops retrieving image data output from the monitoring camera 3 in the memory card 17, and moves to next step SP16.

In the step SP16, the recording and reproduction controller 10 determines whether the ACC is turned on or not. Obtaining a positive determination result in this step means that the ACC is still turned on, and the recording and reproduction controller 10 returns the process to the step SP14 again, and repeats the foregoing process.

In contrast, obtaining a negative determination result in the step SP16 means that the ACC is shifted from an ON state to an OFF state, and the recording and reproduction controller 10 moves to the step SP4 of the routine RT1, and terminates the image recording process.

If a negative determination result is obtained in the step SP11, this means that the backward and forward acceleration based on the backward and forward acceleration data does not satisfy both of the first backward and forward accident determination condition TB1 and the second backward and forward accident determination condition TB2, and the rightward and leftward acceleration based on the rightward and leftward acceleration data does not satisfy the rightward and leftward accident determination condition TB3, and no accident has yet occurred. In this case, the recording and reproduction controller 10 moves to the next step SP14, and repeats the foregoing process.

If a positive determination result is obtained in the step SP14, this means that the IG is still in an ON state, and the recording and reproduction controller 10 moves to next step SP17.

In the step SP17, the recording and reproduction controller 10 determines whether or not image data output from the monitoring camera 3 is currently retrieved in the memory card 17.

If a negative determination result is obtained here, this means that the IG is once turned off, and turned on again in the step SP14 and currently no image data output from the monitoring camera 3 is stored in the memory card 17. In this case, the recording and reproduction controller 10 returns to the step SP10, starts retrieving image data output from the monitoring camera 3 in the memory card 17 again, and repeats the foregoing process.

On the other hand, if a positive determination result is obtained in the step SP17, this means that image data output from the monitoring camera 3 is currently retrieved in the memory card 17. In this case, the recording and reproduction controller 10 returns the process to the step SP11 again, and repeats the foregoing process again.

(3-2) HDD Recording Process

Figure 12:
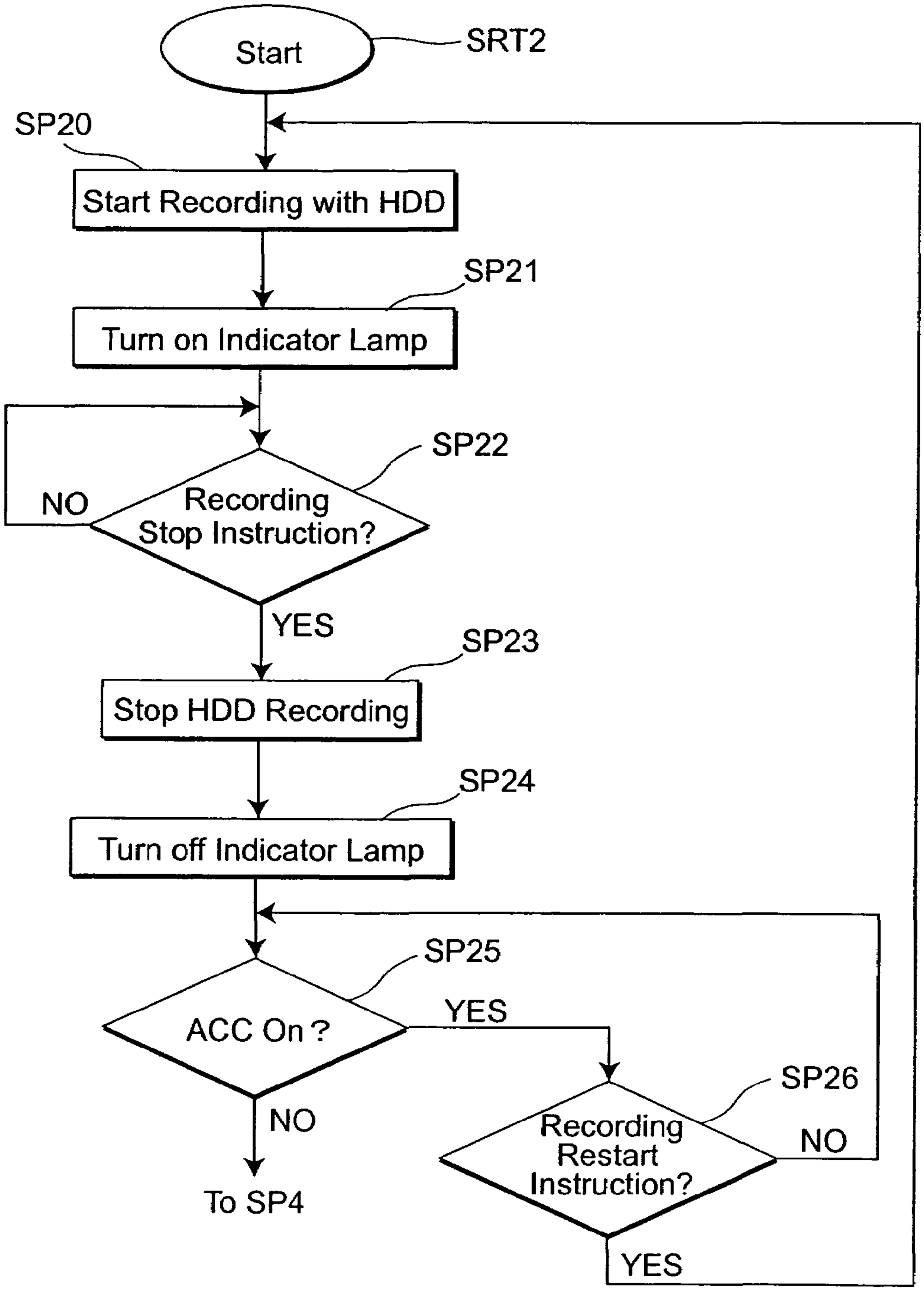
FIG. 12 is a flowchart illustrating the procedures of an HDD recording process.

As illustrated in FIG. 12, the recording and reproduction controller 10 starts an HDD recording process from the start step of the sub routine SRT2, and moves to next step SP20.

In the step SP20, the recording and reproduction controller 10 sends image data output from the monitoring camera 3 to the HDD 12, successively records the image data in association with a count number counted by the recording counter in the HDD 12, and moves to next step SP21.

In this case, the recording and reproduction controller 10 successively writes image data obtained sequentially in the overwritable recording area of the HDD 12. When there becomes no free space in the recording area, the recording and reproduction controller 10 overwrites old data with latest data in order, updating the record contents of the HDD 12 to latest image data within the recording capacity.

The HDD 12 serving as recording means and a second recording medium is a disk-like recording medium which is so loaded as to be unremovable, so-called hard disk, and permits writing and reading of various data, such as image data and sound data, and whose recording capacity is dramatically large in comparison with the recording capacity of the memory card 17. The HDD 12 can successively record image data always obtained from the monitoring camera 3 for a long time.

Next, in the step SP21, the recording and reproduction controller 10 sends a lighting signal to the operation unit 5, has an indicator lamp 20 which is provided on the operation unit 5 lighted up, and moves to next step SP22.

In the step SP22, the recording and reproduction controller 10 determines whether or not a recording stop button 21 of the operation unit 5 has been pressed a recording stop instruction of stopping recording of image data output from the monitoring camera 3 in the HDD 12 is made.

If a negative determination result is obtained, this means that the recording stop button 21 of the operation unit 5 is not yet pressed. In this case, the recording and reproduction controller 10 keeps recording image data output from the monitoring camera 3 in the HDD 12 successively. In contrast, if a positive determination result is obtained in the step SP22, this means that the recording stop button 21 of the operation unit 5 has been pressed. In this case, the recording and reproduction controller 10 moves to next step SP23.

In the step SP23, the recording and reproduction controller 10 stops a recording operation of successively recording image data output from the monitoring camera 3 in the HDD 12, and moves to next step SP24. In the step SP24, the recording and reproduction controller 10 sends a light-out signal to the operation unit 5, turns off the indicator lamp 20, and moves to next step SP25.

In the step SP25, the recording and reproduction controller 10 determines whether or not the ACC is ON. If a positive determination result is obtained, this means that the ACC is still turned on. The recording and reproduction controller 10 moves to next step SP26.

In the step SP26, the recording and reproduction controller 10 determines whether or not the recording stop button 21 of the operation unit 5 has been pressed again and a recording restart instruction of successively recording image data output from the monitoring camera 3 in the HDD 12 again is made.

If a negative determination result is obtained, this means that the recording stop button 21 of the operation unit 5 has not been pressed. In this case, the recording and reproduction controller 10 returns the process to the step SP25, and repeats the foregoing process.

In contrast, if a positive determination result is obtained in the step SP26, this means that the recording stop button 21 of the operation unit 5 has been pressed again. In this case, the recording and reproduction controller 10 returns the process to the step SP20 again, starts recording image data output from the monitoring camera 3 in the HDD 12 successively, and repeats the foregoing process.

If a negative determination result is obtained in the step SP25, this means that the ACC is shifted from an ON state to an OFF state. In this case, the recording and reproduction controller 10 moves to the step SP4 of the routine RT1, and terminates the image recording process.

(4) Reproduction Process

Figure 13:
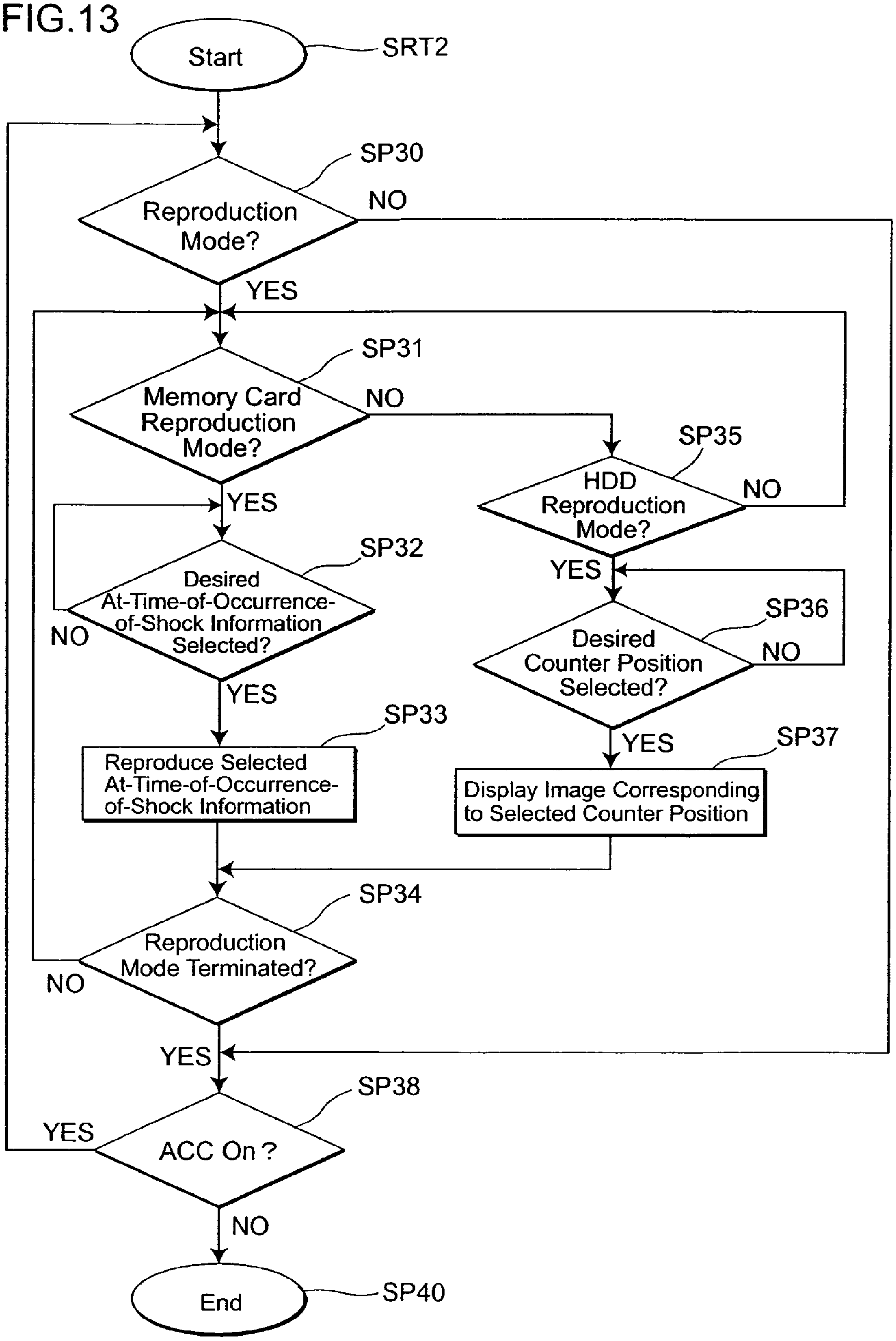
FIG. 13 is a flowchart illustrating the procedures of a reproduction process.

Next, an explanation will be given of a reproduction process of reproducing images based on at-time-of-occurrence-of-shock information recorded in the memory card 17 by the image recording process and images of the monitoring camera 3 successively recorded in the HDD 12 in the vehicular data recording device 1 with the power thereof turned on, and displaying those images on the monitor 4 with reference to the flowchart in FIG. 13.

The recording and reproduction controller 10 starts a process from the start process of the routine RT2, and moves to step SP30. In the step SP30, the recording and reproduction controller 10 determines whether or not a reproduction button 22 of the operation unit 5 has been pressed and the mode shifts to a reproduction mode. If a positive determination result is obtained in this step, this means that the reproduction button 22 of the operation unit 5 has been pressed, and the mode shifts to the reproduction mode. In this case, the recording and reproduction controller 10 moves to next step SP31.

In the step SP31, the recording and reproduction controller 10 determines whether or not a memory card button 23 of the operation unit 5 has been pressed and the mode shifts to a memory card reproduction mode is selected. If a positive determination result is obtained, this means that the memory card button 23 has been pressed, and the memory card reproduction mode is selected. In this case, the recording and reproduction controller 10 moves to next step SP32.

In the step SP32, the recording and reproduction controller 10 selects an arbitrary piece of at-time-of-occurrence-of-shock information in plural pieces of at-time-of-occurrence-of-shock information recorded in the memory card 17, and determines whether or not an Enter button 24 has been pressed and a reproduction instruction is made.

In a case where the memory card 17 continuously records plural pieces of at-time-of-occurrence-of-shock information, as a select button 25 is pressed, the operation unit 5 gives a selection instruction to the recording and reproduction controller 10. The recording and reproduction controller 10 reads out arbitrary one scene of at-time-of-occurrence-of-shock information, which is selected in accordance with the selection instruction, as still picture data, and outputs the still picture data to the monitor 4. Accordingly, the monitor 4 displays a still picture, which is one scene of the at-time-of-occurrence-of-shock information, based on the still picture data.

If a negative determination result is obtained in the step SP32, this means that the Enter button 24 has not been pressed yet. In this case, the recording and reproduction controller 10 stands by until receiving the reproduction instruction from the operation unit 5.

In contrast, if a positive determination result is obtained in the step SP32, this means that the Enter button 24 has pressed. In this case, the recording and reproduction controller 10 moves to next step SP33.

In the step SP33, the recording and reproduction controller 10 reads out image data of the at-time-of-occurrence-of-shock information corresponding to the still picture currently displayed on the monitor 4 based on the reproduction instruction obtained from the operation unit 5 by pressing of the Enter button 24. The recording and reproduction controller 10 outputs the image data the monitor 4, reproduces the at-time-of-occurrence-of-shock information, displays images before and after occurrence of an accident based on the at-time-of-occurrence-of-shock information, and moves to next step SP34.

As a fast reproduction button 26 or a fast reverse reproduction button 27 is pressed during reproduction of the images based on the at-time-of-occurrence-of-shock information, the recording and reproduction controller 10 reads out image data of the at-time-of-occurrence-of-shock information at a predetermined read-out speed from the memory card 17, outputs the image data to the monitor 4, performs fast reproduction or fast reverse reproduction, and permits searching of a desired scene.

If a negative determination result is obtained in the step SP31, this means that the memory card button 23 has not been pressed, and the memory card reproduction mode is not selected. In this case, the recording and reproduction controller 10 moves to next step SP35.

In the step SP35, the recording and reproduction controller 10 determines whether or not an HDD button 28 of the operation button 5 has been pressed and an HDD reproduction mode is selected. If a negative determination result is obtained, this means that the HDD button 28 has not been pressed, and both of the memory card reproduction mode and the HDD reproduction mode are not selected. In this case, the recording and reproduction controller 10 returns the process to the step SP31, and repeats the foregoing process.

If a positive determination result is obtained in the step SP35, this means that the HDD button 28 has been pressed, and the HDD reproduction mode is selected. In this case, the recording and reproduction controller 10 moves to next step SP36.

The recording and reproduction controller 10 reads out the count numbers associated with plural pieces of image data recorded in the HDD 12 from the HDD 12, outputs the count number to the monitor 4 and displays it.

In the step SP36, the recording and reproduction controller 10 determines whether or not image data at a predetermined count position has been selected based on the count numbers displayed on the monitor 4, the Enter button 24 has been pressed, and the reproduction instruction is given. If a negative determination result is obtained here, this means that the Enter button 24 has been pressed. In this case, the recording and reproduction controller 10 stands by until receiving the reproduction instruction from the operation unit 5.

In contrast, if a positive determination result is obtained in the step SP36, this means that the Enter button 24 has been pressed. In this case, the recording and reproduction controller 10 moves to next step SP37.

In the step SP37, the recording and reproduction controller 10 reads out image data corresponding to the count position selected through the monitor 4 from the HDD 12 based on the reproduction instruction obtained from the operation unit 5 by pressing the Enter button 24, outputs the image data to the monitor 4, reproduces it, and displays images in various situations based on the image data on the monitor 4. The recording and reproduction controller 10 moves to next step SP34.

In the step SP34, the recording and reproduction controller 10 determines whether or not a stop button 29 has been pressed and the reproduction mode is terminated. If a negative determination result is obtained, this means that the stop button 29 has not been pressed yet, and the reproduction mode is maintained. In this case, the recording and reproduction controller 10 returns the process to the step SP31, and repeats the foregoing process.

In contrast, if a positive determination result is obtained in the step SP34, this means that the stop button 29 has been pressed, and the reproduction mode is terminated. In this case, the recording and reproduction controller 10 moves to next step SP38.

The recording and reproduction controller 10 determines whether the ACC is ON or not in the step SP38. If a positive determination result is obtained in this step, this means that the ACC is still turned on. In this case, the recording and reproduction controller 10 returns the process to the step SP30 again, and repeats the foregoing process.

In contrast, if a negative determination result is obtained in the step SP38, this means that the ACC is shifted from an ON state to an OFF state. In this case, the recording and reproduction controller 10 moves to next step SP40, and terminates the reproduction process.

If a negative determination result is obtained in the step SP30, this means that the reproduction button 22 of the operation unit 5 has not been pressed, and the mode is not yet shifted to the reproduction mode. In this case, the recording and reproduction controller 10 moves to the step SP38, and repeats the foregoing process.

(5) At-Time-of-Occurrence-of-Shock Information Transfer Process

Figure 14:
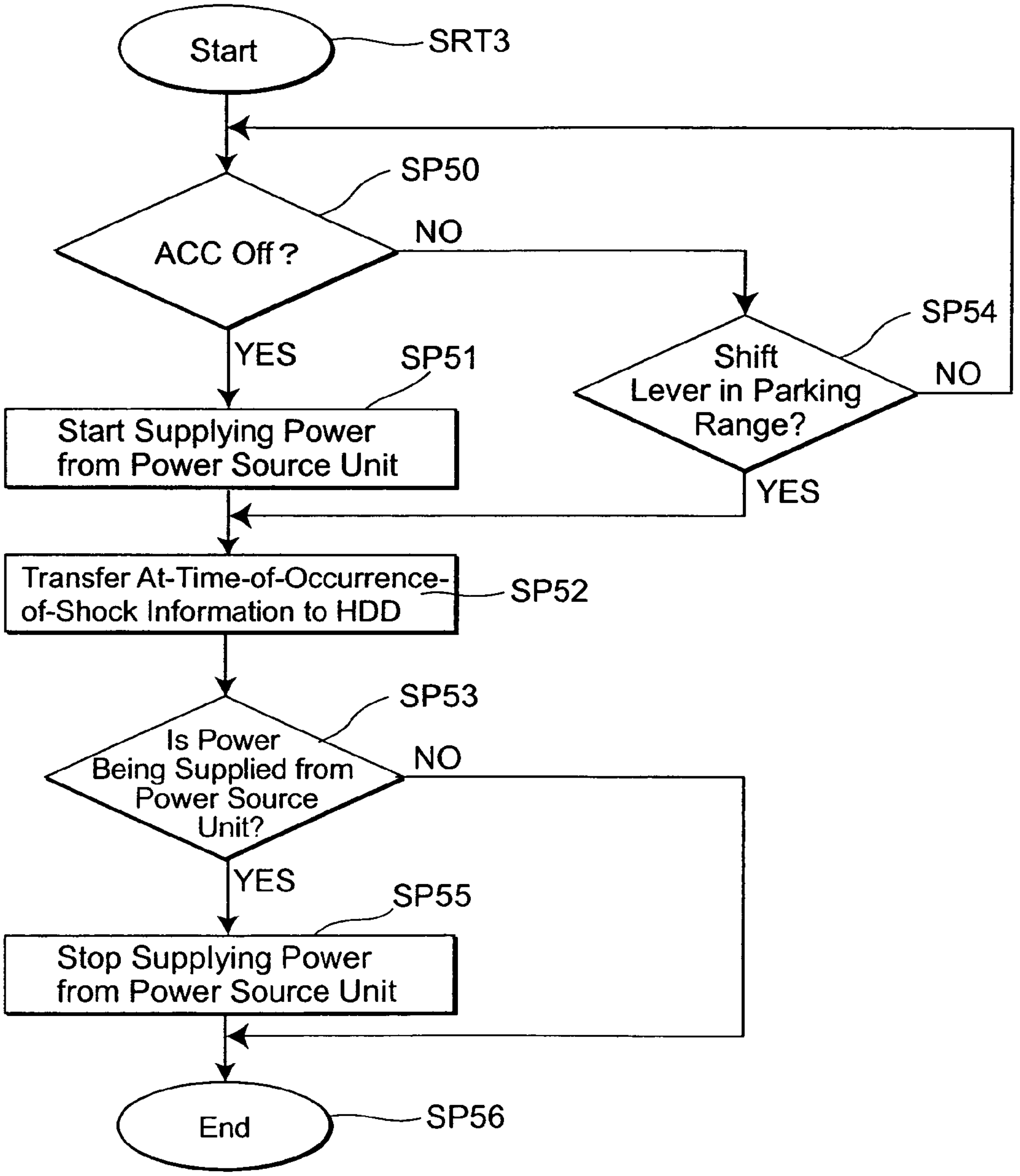
FIG. 14 is a flowchart illustrating the procedures of a at-time-of-occurrence-of-shock information transfer process.

Next, an explanation will be given of at-time-of-occurrence-of-shock information transfer process of recording at-time-of-occurrence-of-shock information recorded in the memory card 17 by the image recording process in the HDD 12 with reference to the flowchart in FIG. 14.

The recording and reproduction controller 10 starts the process from the start step of a routine RT3, and moves to step SP50. The recording and reproduction controller 10 determines whether or not the ACC is turned off in the step SP50. If a negative determination result is obtained, this means that the ACC is turned off, and power supply from the in-vehicle power source is stopped. In this case, the recording and reproduction controller 10 moves to next step SP51.

In the step SP51, the recording and reproduction controller 10 starts supplying power from the power source unit 11, sets each circuit of the device main unit 7 operable, and moves to next step SP52.

In contrast, if a negative determination result is obtained in the step SP50, this means that the ACC is not turned off, and the in-vehicle power source supplies power. In this case, the recording and reproduction controller 10 moves to next step SP54.

In the step SP54, the recording and reproduction controller 10 determines whether or not the shift lever is currently in a parking range based on a range signal received from an automatic transmission (not illustrated).

If a negative determination result is obtained, this means that the shift lever is in, for example, a neutral range, a drive range, or a reverse range, other than the parking range, i.e., the vehicle 2 is currently driven, not parked. In this case, the recording and reproduction controller 10 returns the process to the step SP50, and repeats the foregoing process.

In contrast, if a positive determination result is obtained in the step SP54, this means that the shift lever is in the parking range, i.e., the vehicle 2 is currently parked. In this case, the recording and reproduction controller 10 moves to next step SP52.

In the step SP52, the recording and reproduction controller 10 sequentially copies at-time-of-occurrence-of-shock information recorded in the memory card 17, transfers the at-time-of-occurrence-of-shock information to the HDD 12, records it in the HDD 12, and moves to next step SP53.

The recording and reproduction controller 10 records all at-time-of-occurrence-of-shock information recorded in the memory card 17 in the HDD 12 in this manner.

In a case where the same at-time-of-occurrence-of-shock information as shocked-time recorded in the memory card 17 is already recorded in the HDD 12, the recording and reproduction controller 10 deletes the copied at-time-of-occurrence-of-shock information without recording it in the HDD 12, thereby avoiding redundantly recording the same at-time-of-occurrence-of-shock information in the HDD 12.

In the step SP53, the recording and reproduction controller 10 determines whether or not the power source unit 11 supplies power. If a negative determination result is obtained in this step, this means that no power is supplied from the power source unit 11, i.e., the process has progressed through the steps SP50, SP54, and SP52 and the vehicular data recording device 1 is operated by power supplied from the in-vehicle power source. In this case, the recording and reproduction controller 10 moves to next step SP56, and terminates the at-time-of-occurrence-of-shock information transfer process.

On the other hand, if a positive result is obtained in the step SP53, this means that the power is supplied from the power source unit 11, i.e., the process has progressed through the steps SP50, SP51, and SP52. In this case, the recording and reproduction controller 10 moves to next step SP55.

In the step SP55, the recording and reproduction controller 10 stops power supply from the power source unit 11, moves to next step SP56, and terminates the at-time-of-occurrence-of-shock information transfer process.

(6) Dubbing Process

Figure 15:
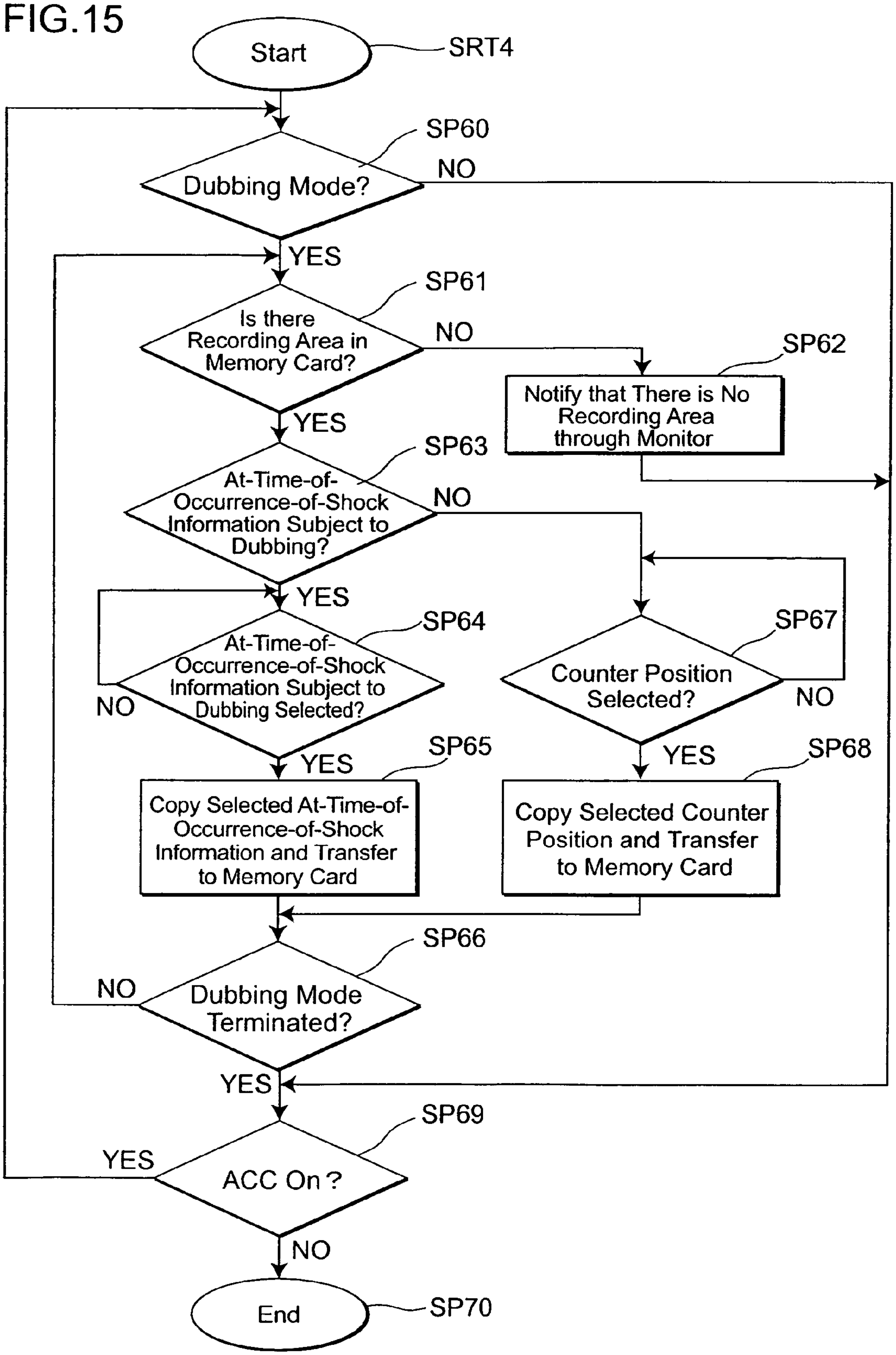
FIG. 15 is a flowchart illustrating the procedures of a dubbing process.

Next, an explanation will be given of a dubbing process of recording at-time-of-occurrence-of-shock information stored in the HDD 12 and image data of the monitoring camera 3 successively updated and recorded in the HDD 12 in the memory card 17 with the vehicular data recording device 1 powered on with reference to the flowchart in FIG. 15.

The recording and reproduction controller 10 starts the process from the start step of a routine RT4, and moves to step SP60. In the step SP60, the recording and reproduction controller 10 determines whether or not a dubbing button 30 of the operation unit 5 has been pressed and the mode is shifted to a dubbing mode. If a positive determination result is obtained in this step, this means that the dubbing button 30 of the operation unit 5 has pressed and the mode is shifted to the dubbing mode. In this case, the recording and reproduction controller 10 moves to next step SP61.

In the step SP61, the recording and reproduction controller 10 determines whether or not the memory card 17 has a recording area for newly recording an image or the like in the HDD 12. If a negative determination result is obtained in this step, this means that, for example, a plural pieces of at-time-of-occurrence-of-shock information has been already stored in the memory area of the memory card 17, so that there is no recording area in the memory card 17 for newly recording the image or the like in the HDD 12. In this case, the recording and reproduction controller 10 moves to next step SP62.

In the step SP62, the recording and reproduction controller 10 displays a comment text to the effect that there is no recording area in the memory card 17 on the monitor 4, and notifies the driver that the image or the like in the HDD 12 is not transferable to the memory card 17 through the monitor 4, and moves to next step SP69.

On the other hand, if a positive determination result is obtained, this means that, for example, at-time-of-occurrence-of-shock information has not been stored in the recording area of the memory card 17 yet, and there is the recording area in the memory card 17 for recording the image or the like in the HDD 12. In this case, the recording and reproduction controller 10 moves to next step SP63.

In the step SP63, the recording and reproduction controller 10 determines whether or not at-time-of-occurrence-of-shock information dubbing mode of transferring at-time-of-occurrence-of-shock information stored in the HDD 12 to the memory card 17 is selected through the select button 25. If a positive determination result is obtained in this step, this means that the at-time-of-occurrence-of-shock information dubbing mode is selected through the select button 25. In this case, the recording and reproduction controller 10 moves to next step SP64.

In the step SP64, the recording and reproduction controller 10 stands by until arbitrary at-time-of-occurrence-of-shock information to be copied in the memory card 17 is selected through the select button 25, and the Enter button 24 is pressed to set a dubbing instruction. When a positive result is obtained, the recording and reproduction controller 10 moves to next step SP65.

In the step SP65, the recording and reproduction controller 10 copies the at-time-of-occurrence-of-shock information selected in the step SP64, transfers copied at-time-of-occurrence-of-shock information from the HDD 12 to the memory card 17, and moves to next step SP66.

If a negative determination result is obtained in the step SP63, this means that a driving-time image dubbing mode of copying an image other than at-time-of-occurrence-of-shock information at an arbitrary time is selected through the select button 25. In this case, the recording and reproduction controller 10 moves to next step SP67.

In the step SP67, the recording and reproduction controller 10 displays the count numbers associated when plural pieces of image data are successively recorded in the HDD 12 on the monitor 4, and stands by until a piece of image data at a desired time is selected based on the displayed count numbers and the Enter button 24 is pressed to set a dubbing instruction. When a positive result is obtained, the process progresses to next step SP68.

In the step SP68, the recording and reproduction controller 10 copies image data selected in the step SP67, transfers copied data to the memory card 17 from the HDD 12, and moves to the next step SP66.

In the step SP66, the recording and reproduction controller 10 determines whether or not the dubbing button 30 has been pressed again and the dubbing mode is terminated. If a negative determination result is obtained, this means that the dubbing button 30 has not been pressed yet, and the dubbing mode is maintained. In this case, the recording and reproduction controller 10 moves to the step SP61 again, and repeats the foregoing process.

In contrast, if a positive determination result is obtained in the step SP66, this means that the dubbing button has been pressed again and the dubbing mode is terminated. In this case, the recording and reproduction controller 10 moves to next step SP69.

In the step SP69, the recording and reproduction controller 10 determines whether or not the ACC is ON. If the positive determination result is obtained, this means that the ACC is still turned on. In this case, the recording and reproduction controller 10 return to the step SP60 again, and repeats the foregoing process.

In contrast, if a negative determination result is obtained in the step SP69, this means that the ACC is shifted from an ON state to an OFF state. In this case, the recording and reproduction controller 10 moves to next step SP70, and terminates the dubbing process.

Note that if a negative determination result is obtained in the step SP60, this means that the dubbing button 30 of the operation unit has not been pressed, and the mode is not shifted to the dubbing mode yet. In this case, the recoding and reproduction controller 10 moves to next step SP69, and repeats the foregoing process.

(7) Operation and Effect

In the vehicular data recording device 1 with the aforementioned structure, the memory card 17 and the HDD 12 whose -recording capacity is dramatically larger than the recording capacity of the memory card 17 are provided. Images acquired by the monitoring camera 3 in driving are temporarily stored in the memory card 17, and successively recorded updated and recorded in the HDD 12.

The vehicular data recoding device 1 specifies at-time-of-occurrence-of-shock information with the accident determination table T100, and records the specified at-time-of-occurrence-of-shock information in the images temporarily stored in the memory card 17 in the memory card 17.

Accordingly, in the vehicular data recording device 1, only at-time-of-occurrence-of-shock information is continuously recorded in the memory card 17 whose memory capacity is relatively small, so that images before and after a past accident can be surely supplied to the driver.

In the vehicular data recoding device 1, as images from the monitoring camera 3 are successively updated and recorded in the HDD 12 which is recordable dramatically longer than the memory card 17, all images picked up by the monitoring camera 3 in driving can be surely recorded. Accordingly, not only images before and after an accident, but also images in various situations not leading to an accident can be surely supplied to the driver, and this can prompt the driver to reflect the situations occurred while driving.

In the vehicular data recording device 1, even if a magnetic head contacts a hard disk as a disk-like recording medium because of the shock of an accident so that the HDD 12 is damaged, at-time-of-occurrence-of-shock information is separately recorded in the memory card 17 which has a different structure from that of the HDD 12. Accordingly, images before and after the accident can be surely supplied to the driver.

The vehicular data recording device 1 specifies at-time-of-occurrence-of-shock information to be recorded in the memory card 17 with the accident determination table T100 created based on a backward and forward acceleration and a rightward and leftward acceleration. Accordingly, not only a shock generated when the vehicle 2 contacts another vehicle or the like, but also a backward and forward acceleration generated by a harsh braking or the like make it possible to record images when the vehicle 2 contacts another vehicle or the harsh braking is made as at-time-of-occurrence-of-shock information in the memory card 17. Accordingly, a dangerous situation not leading to an accident can be recorded as an image in the memory card 17, so that the image on the past dangerous situation not leading to the accident can be supplied to the driver.

The vehicular data recording device 1 transfers at-time-of-occurrence-of-shock information recorded in the memory card 17, at-time-of-occurrence-of-shock information recorded in the HDD 12, and images successively updated and recorded in the HDD 12 from the memory card 17 to the HDD 12, or from the HDD 12 to the memory card 17. Accordingly, those images may be collected in either one of the memory card 17 and the HDD 12, and easily edited.

In particular, in the vehicular data recording device 1, the memory card 17 is so provided as to be removable from the device main unit 7. Accordingly, the memory card 17 can be removed, and loaded in another device like a personal computer which is structured in such a manner as to reproduce the memory card 17. The contents of at-time-of-occurrence-of-shock information recorded in the memory card 17 can be reproduced by another device.

In the vehicular data recording device 1, even if the ACC is turned off or turned on, when the shift lever is in the parking range, at-time-of-occurrence-of-shock information recorded in the memory card 17 is automatically transferred in the HDD 12 having a large recording capacity. Accordingly, the at-time-of-occurrence-of-shock information can be surely saved in the HDD 12 before the recoding capacity of the memory card 17 reaches the limit.

According to the vehicular data recording device 1, images on a past dangerous situation are automatically saved in the HDD 12 without a complicated operation of the driver through the operation unit 5. This eliminates a complicated driver's editing operation.

As explained above, according to the embodiment, not only images from the monitoring camera 3 when a shock is detected are simply recorded in the memory card 17, but also images from the monitoring camera 3 when a shock is not detected are always directly updated and recorded in the HDD successively. Accordingly, images from the monitoring camera 3 in various situations not leading to an accident can be surely supplied to the driver. This results in prompting the driver to reflect the driving thereof based on the images from the monitoring camera 3 in the various situations. Therefore, the driver can figure out the driving skill thereof, and improve the driving skill.

According to the embodiment, at-time-of-occurrence-of-shock information successively saved in the memory card 17 is transferred to the HDD 12 by the at-time-of-occurrence-of-shock information transfer process before the recording capacity of the memory card 17 reaches the limit. The HDD 12 can surly save the at-time-of-occurrence-of-shock information by transferring the at-time-of-occurrence-of-shock information saved in the memory card 17 to the HDD 12 which is recordable longer than the memory card 17.

The present invention is not limited to the foregoing embodiment, and can be modified in various forms within the scope of the invention. For example, a microphone which collects an external sound or the like may be used as the in-vehicle sensor, and the monitoring camera and the microphone may be used together.

What is claimed is:

1. A vehicular data recording device comprising:

a recording unit which records outputs from an in-vehicle sensor, mounted in a vehicle, before and after a shock is applied to said vehicle; and a shock detection unit which detects a shock to said vehicle, wherein said recording unit includes:

a first recording medium;

a second recording medium which can record longer than said first recording medium; and a recording controller which saves outputs from said in-vehicle sensor in said first recording medium continuously based on a detection result of said shock detection unit, and successively updates and records outputs from said in-vehicle sensor within a recording capacity of said second recording medium regardless of the detection result of said shock detection unit.

2. The vehicular data recording device according to claim 1, wherein said recording controller transfers said outputs from said in-vehicle sensor continuously saved in said first recording medium to said second recording medium before a recording capacity of said first recording medium reaches a limit.

3. The vehicular data recording device according to claim 1, wherein when detecting a backward and forward acceleration or a rightward and leftward acceleration which satisfies a predetermined condition from said shock detection means, said recording controller saves an output at a predetermined time out of the outputs stored in said first recording medium into said first recording medium as information at the time of occurrence of shock.

4. The vehicular data recording medium according to claim 1, wherein said in-vehicle sensor is a monitoring camera.

5. The vehicular data recording medium according to claim 1, wherein said first recording medium is a portable external memory which comprises an electrically rewritable nonvolatile memory, and is freely removable from a device main unit, and said second recording medium is a hard disk drive installed in said device main unit.

6. The vehicular data recording medium according to claim 3, structured in such a way that said information at the time of occurrence of shock as recorded in said first recording medium is transferable to said second recording medium, and said information at the time of occurrence of shock recorded in said second recording medium is transferable to said first recording medium.

7. The vehicular data recording medium according to claim 3, wherein when an ACC is turned off or a shift lever is in a parking range even though an ACC is turned on, said information at the time of occurrence-of shock recorded in said first recording medium is automatically transferred to said second recording medium.

* * * * *